(12) United States Patent
Cheng et al.

(10) Patent No.: US 12,476,709 B2
(45) Date of Patent: Nov. 18, 2025

(54) LASER CHIP, INJECTION-LOCKED LASER, AND NETWORK DEVICE

(71) Applicant: HUAWEI TECHNOLOGIES CO., LTD., Shenzhen (CN)

(72) Inventors: Yuanbing Cheng, Wuhan (CN); Yuanfeng Mao, Wuhan (CN); Guangcan Chen, Wuhan (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 296 days.

(21) Appl. No.: 18/299,166

(22) Filed: Apr. 12, 2023

(65) Prior Publication Data

US 2023/0254044 A1    Aug. 10, 2023

Related U.S. Application Data (63) Continuation of application No. PCT/CN2021/122786, filed on Oct. 9, 2021.

(30) Foreign Application Priority Data

Oct. 16, 2020 (CN) .......................... 202011109710.X (51) Int. Cl.
*H04B 10/50* (2013.01)
*H01S 5/00* (2006.01)
(Continued)

(52) U.S. Cl.
CPC ......... *H04B 10/503* (2013.01); *H01S 5/0064* (2013.01); *H01S 5/0085* (2013.01);
(Continued)

(58) Field of Classification Search
None
See application file for complete search history.

(56) References Cited

U.S. PATENT DOCUMENTS

| | | | |
|---|---|---|---|
| 4,791,633 A | 12/1988 | Esherick et al. | |
| 7,209,664 B1* | 4/2007 | McNicol | H04B 10/64 375/219 |

(Continued)

FOREIGN PATENT DOCUMENTS

| | | | |
|---|---|---|---|
| CN | 101259352 A | * | 9/2008 |
| CN | 101621178 A | | 1/2010 |

(Continued)

OTHER PUBLICATIONS

Extended European Search Report issued in corresponding European Application No. 21879299.2, dated Feb. 7, 2024, pp. 1-8.

(Continued)

*Primary Examiner* — Darren E Wolf
(74) *Attorney, Agent, or Firm* — HAUPTMAN HAM, LLP (57) ABSTRACT

A laser chip includes a first power detector, a first controller, an optical splitter, a polarization splitter-rotator, a bandpass filter, and a slave laser. The optical splitter includes a first, a second, and a third port. The first port is configured to receive injection light of a master laser. The second port is connected to the first power detector. The optical splitter is configured such that the injection light enters the optical splitter through the first port, and is output to the polarization splitter-rotator through the third port. The polarization splitter-rotator is configured to perform optical splitting and polarization conversion on the injection light. The polarization splitter-rotator includes a first waveguide configured to transmit TE mode injection light after the injection light is split by the polarization splitter-rotator, and a second waveguide configured to transmit TM mode injection light after the injection light is split by the polarization splitter-rotator.

16 Claims, 4 Drawing Sheets

(51) Int. Cl.
      *H01S 5/024*          (2006.01)
      *H01S 5/0683*       (2006.01)
      *H01S 5/40*           (2006.01)

(52) U.S. Cl.
     CPC ...... *H01S 5/02415* (2013.01); *H01S 5/06837* (2013.01); *H01S 5/4006* (2013.01)

(56) References Cited

U.S. PATENT DOCUMENTS

| | | | |
|---|---|---|---|
| 2011/0097075 A1* | 4/2011 | Tanimura | H04B 10/07953 398/1 |
| 2012/0076507 A1* | 3/2012 | Roberts | H04B 10/64 398/205 |
| 2016/0301477 A1* | 10/2016 | Orcutt | H04B 10/801 |
| 2020/0301070 A1* | 9/2020 | Nagarajan | H04B 10/5053 |

FOREIGN PATENT DOCUMENTS

| | | | |
|---|---|---|---|
| CN | 105589506 A | 5/2016 |
| CN | 106921441 A | 7/2017 |
| CN | 108476065 B | 6/2020 |

OTHER PUBLICATIONS

Chinese Office Action issued in corresponding Chinese Application No. 202011109710.X, dated Feb. 1, 2024, pp. 1-7.

\* cited by examiner

LASER CHIP, INJECTION-LOCKED LASER, AND NETWORK DEVICE

CROSS-REFERENCE TO RELATED APPLICATIONS

This application is a continuation of International Patent Application No. PCT/CN2021/122786, filed on Oct. 9, 2021, which claims priority to Chinese Patent Application No. 202011109710.X, filed on Oct. 16, 2020, the disclosures of the aforementioned applications are hereby incorporated by reference in their entireties.

TECHNICAL FIELD

This application relates to the field of communications technologies, and in particular, to a laser chip, an injection-locked laser, and a network device.

BACKGROUND

With the rapid popularization of internet video applications and the development of high-bandwidth services such as a 4K/8K high definition service, a home cloud service, and a video call service, users have requirements for increasingly large communication capacities. Therefore, the laser that serves as a light source is required to have higher output optical power, a lower threshold current, higher modulation bandwidth, lower relative intensity noise (RIN), higher linearity, or a narrower line width. Lasers of some approaches are limited by chip materials or waveguide structures. Therefore, it is difficult to have all the foregoing characteristics.

The injection locking technology provides a means to improve the performance of the laser from the outside, and this enables the laser to feature all the above characteristics. The main technical principle of the injection-locked laser is as follows: Laser light with similar wavelengths and same polarization (the laser light comes from the master laser) is injected into the target slave laser cavity. When the master laser and the slave laser are sufficiently coupled, the lasing wavelength of the slave laser can be locked to the lasing wavelength of the master laser. In this case, a phase difference between the laser light generated by the master laser and the slave laser is a constant value, so that injection locking is implemented.

There are mainly two aspects factors affecting injection locking: a wavelength locking range of the injection-locked laser and a ratio of injection of the master laser to injection of the slave laser, and whether the polarization of the master laser is the same as the polarization of the slave laser. In some approaches, it is difficult to ensure that optical power injected by the master laser into each slave laser cavity is strong enough, and this may cause the slave laser to be unlocked. For polarization control of the master laser and the slave laser, a polarization state of the master laser is currently manually adjusted by using a polarization controller, so that the polarization of the master laser is the same as that of the slave laser, but practicability is poor.

SUMMARY

One or more embodiments of the present application provide a laser chip, an injection-locked laser, and a network device, to implement stable and efficient injection locking. In this way, good practicability is achieved.

According to an aspect, at least one embodiment of the present application provides a laser chip. The laser chip includes a first power detector, a first controller, and an optical splitter, a polarization splitter-rotator, a bandpass filter, and a slave laser that are sequentially connected. The optical splitter includes a first port, a second port, and a third port. The first port is configured to receive injection light of the master laser, second port is connected to the first power detector, and the third port is connected to the polarization splitter-rotator. The injection light enters the optical splitter through the first port, and is output to the polarization splitter-rotator through the third port. The polarization splitter-rotator is configured to perform optical splitting and polarization conversion on the injection light. The polarization splitter-rotator includes a first waveguide and a second waveguide, where after the injection light is split by the polarization splitter-rotator, the first waveguide is configured to transmit TE mode injection light, the second waveguide is configured to transmit TM mode injection light, and after the TM mode injection light is converted into the TE mode injection light, the TE mode injection light of the first waveguide and the TE mode injection light of the second waveguide are output to the bandpass filter and injected into the slave laser. A light beam generated from the slave laser enters the optical splitter through the third port after passing through the bandpass filter and the polarization splitter-rotator, one part of the light beam is output through the first port, and the other part of the light beam is output through the second port to the first power detector. The first power detector is configured to detect optical power of light output through the second port, and generate a first detection signal. The first controller is configured to perform current adjustment and/or temperature adjustment on the slave laser based on the first detection signal, to change a transmit wavelength of the slave laser, so as to enable the optical power detected by the first power detector to reach a first preset value (for example, a maximum value).

In some embodiments, for the laser chip, the injection light of the master laser can be efficiently injected into the slave laser, and optical power of the slave laser can be effectively detected under action of the first power detector and the first controller, and a current and/or temperature of the slave laser can be automatically adjusted based on the first detection signal generated by the first power detector, to implement stable and efficient injection locking. In this way, good practicability is achieved.

In some embodiments, the laser chip further includes a slave laser heater, where the slave laser heater is configured to control temperature of the slave laser. The first controller is connected to the slave laser heater, and is configured to adjust heating power of the slave laser heater based on the first detection signal, to change the transmit wavelength of the slave laser, so as to enable the optical power detected by the first power detecting unit to reach the first preset value.

In some embodiments, the slave laser heater may be a thermoelectric cooler. In addition, the laser chip may be a silicon photonic chip of an SOI platform. Alternatively, the slave laser and a silicon photonic chip may be of a heterogeneous integration structure.

In some embodiments, the laser chip further includes a bandpass filter heater, a second power detector, and a second controller. The bandpass filter may be a silicon-based optical microring resonant cavity, or may be a lithium niobate thin film microring resonant cavity, a Mach Zehnder interferometer resonant cavity, or the like. In addition, the microring resonant cavity may be of a single microring structure, or may be of a cascaded microring structure.

In some embodiments, the bandpass filter heater is configured to control temperature of the bandpass filter, to change a center frequency of the bandpass filter, so that a frequency of the injection light of the master laser is aligned with the center frequency of the bandpass filter, and the injection light can be efficiently used. When adjusting the center frequency of the bandpass filter, the second power detector may select a proportion of optical power, to detect optical power filtered by the bandpass filter, and generate a second detection signal. The second controller is connected to the second power detector and the bandpass filter heater, and is configured to adjust heating power of the bandpass filter heater based on the second detection signal, to change the center frequency of the bandpass filter, so as to enable the optical power detected by the second power detector to reach a second preset value (for example, a minimal value).

In some embodiments, the transmit wavelength of the slave laser may be adjusted when the injection locking of the slave laser is implemented, or when optical power received by the second power detector is minimum.

In some embodiments, the first controller is further connected to the second power detector. The first controller is configured to: when the optical power detected by the second power detector reaches the second preset value (for example, the minimum value), perform current adjustment and/or temperature adjustment on the slave laser based on the first detection signal, to change the transmit wavelength of the slave laser, so as to enable the optical power detected by the first power detector to reach the first preset value (for example, the maximum value).

In some embodiments, the center frequency of the bandpass filter may be adjusted, so that the center frequency of the bandpass filter is aligned with a center frequency of the injection light, and the injection light can be efficiently used. Then, the transmit wavelength of the slave laser is adjusted, so that the transmit wavelength of the slave laser is aligned with a wavelength of the injection light, to implement stable and efficient injection locking for the slave laser.

In some embodiments, the laser chip further includes a multiplexed-wavelength structure, where the polarization splitter-rotator is connected to the bandpass filter via the multiplexed-wavelength structure, and the multiplexed-wavelength structure is configured to multiplex the TE mode injection light of the two waveguides of the polarization splitter-rotator and then transmit the multiplexed TE mode injection light to the bandpass filter.

In some embodiments, the multiplexed-wavelength structure may be a single coupling waveguide, or may be a plurality of cascaded coupling waveguides. The coupling waveguide may be a Y coupling waveguide, a directional coupler waveguide, or a multimode interferometer waveguide. In some embodiments, a type of the coupling waveguide may be correspondingly selected and adjusted based on an actual requirement. This is not limited in this application.

In some embodiments, to implement coherence enhancement for two beams of multiplexed TE mode injection light, in some embodiments, phases of the two to-be-multiplexed beams of TE mode injection light may also be adjusted.

For example, in an implementation, the laser chip further includes a multiplexed-wavelength heater, a third power detector, and a third controller.

In some embodiments, the multiplexed-wavelength heater is configured to control temperature of the multiplexed-wavelength structure, to change a phase of TE mode injection light in a path, so that the coherence enhancement is implemented for the two beams of multiplexed TE mode injection light is implemented. In this way, optical power detected by the third power detector reaches a third preset value (for example, a maximum value). Specifically, when the optical power detected by the third power detector reaches the third preset value, it indicates that the coherence enhancement is implemented for the two beams of multiplexed TE mode injection light. In this way, utilization efficiency of the injection light can be effectively improved.

It may be understood that, in some embodiments, the multiplexed-wavelength structure may alternatively include three, four, or more cascaded coupling waveguides, to implement higher-precision adjustment on the phase of the TE mode injection light. It may be understood that, when the multiplexed-wavelength structure includes the plurality of cascaded coupling waveguides, a quantity of disposed multiplexed-wavelength heaters is the same as a quantity of disposed coupling waveguides, and one multiplexed-wavelength heater is disposed in correspondence to one coupling waveguide. Alternatively, in some implementations, the multiplexed-wavelength structure may include a single coupling waveguide, to reduce difficulty and complexity of adjustment.

According to a second aspect, at least one embodiment of the present application further provides an injection-locked laser, including a master laser, an isolator, and any one of the foregoing laser chips. Injection light generated by the master laser enters the first port of the optical splitter through the isolator, and is finally transmitted to a slave laser, to implement injection locking of the slave laser. The isolator is a passive optical device for non-reciprocal optical transmission, and a basic function of the isolator is to implement forward transmission of an optical signal and suppress reverse light. The injection light of the master laser is injected into the laser chip through the isolator, so that reflected light generated by the slave laser is not transmitted to the master laser, to ensure work stability of the master laser.

In addition, at least one embodiment of the present application further provides a network device including the foregoing injection-locked laser. The network device may include a frequency division multiple access device and the foregoing injection-locked laser. A signal of the frequency division multiple access device is modulated to the injection-locked laser, and the injection-locked laser transmits the signal in a form of an optical signal. The injection-locked laser may be used as an optical source of an optical network unit (Optical Network Unit, ONU) for a passive optical network system (Passive Optical Network, PON). Alternatively, the injection-locked laser may be used in an optical line termination (Optical Line Termination, OLT).

DETAILED DESCRIPTION

To make objectives, technical solutions, and advantages of this application clearer, the following further describes this application in detail with reference to the accompanying drawings and specific embodiments.

Terms used in the following embodiments are merely intended to describe specific embodiments, but are not intended to limit this application. Terms "one", "a", "the foregoing", and "this" of singular forms used in this specification and the appended claims of this application are also intended to include expressions such as "one or more", unless otherwise specified in the context clearly.

Reference to "one embodiment" described in this specification or the like means that one or more embodiments of this application include a particular feature, structure, or characteristic described in combination with the embodiment. Therefore, in this specification, statements, such as "in an embodiment", "in some embodiments", and "in some other embodiments", that appear at different places do not necessarily mean to refer to a same embodiment, instead, the statements mean to refer to "one or more but not all of the embodiments", unless otherwise specifically emphasized in other ways. Terms "include", "have", and their variants all mean "include but are not limited to", unless otherwise specifically emphasized in another manner.

Figure 1:
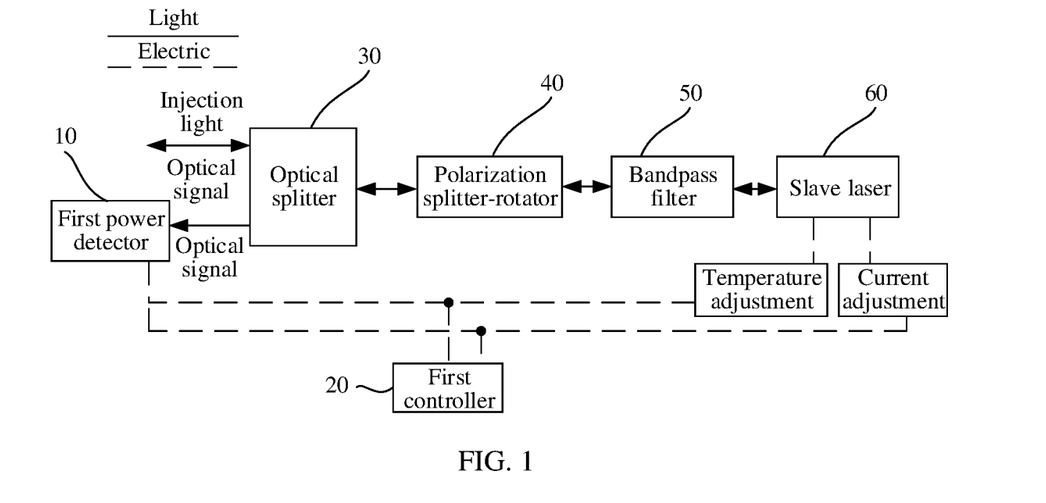
FIG. 1 is a block diagram of a structure of a laser chip according to an embodiment of this application.

FIG. 1 is a block diagram of a structure of a laser chip according to an embodiment of this application. The laser chip includes a first power detector 10, a first controller 20, an optical splitter 30, a polarization splitter-rotator 40, a bandpass filter 50, and a slave laser 60. The optical splitter 30, the polarization splitter-rotator 40, the bandpass filter 50, and the slave laser 60 are sequentially connected, and the first controller 20 is connected to the first power detector 10 and the slave laser 60. The optical splitter 30 includes a first port (not shown in the figure), a second port (not shown in the figure), and a third port (not shown in the figure). The first port is configured to receive injection light of the master laser, the second port is connected to the first power detector 10, and the third port is connected to the polarization splitter-rotator 40. The injection light enters the optical splitter 30 through the first port, and is output to the polarization splitter-rotator 40 through the third port. The polarization splitter-rotator 40 is configured to perform optical splitting and polarization conversion on the injection light.

Figure 2:
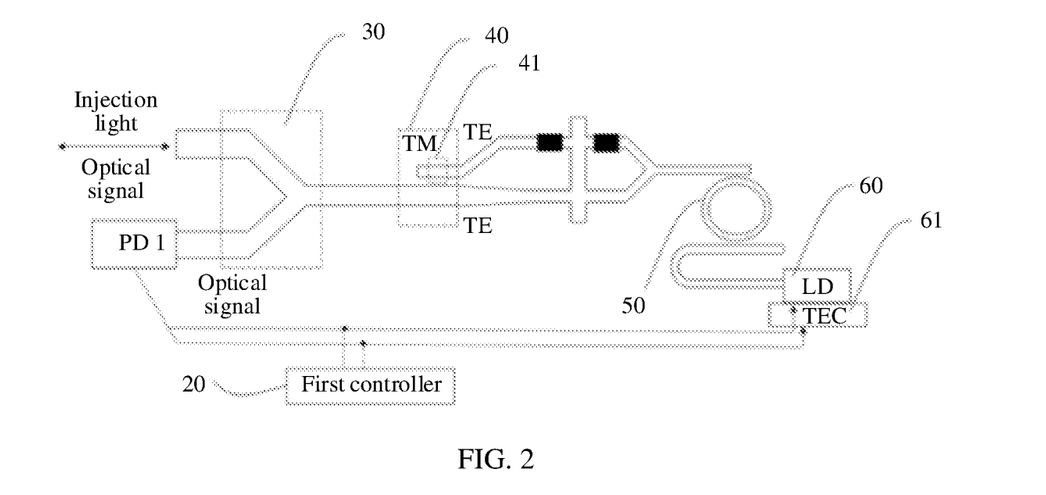
FIG. 2 is a simplified schematic diagram of a structure of a laser chip according to an embodiment of this application.

FIG. 2 is a simplified schematic diagram of a structure of a laser chip according to an embodiment of this application. Injection light generally includes injection light in any polarization state (for example, a TE mode or a TM mode). After being injected into an optical splitter 30 through a first port, the injection light is output to a polarization splitter-rotator 40 through a third port of the optical splitter 30. The polarization splitter-rotator 40 first splits the injection light, to separate TE mode injection light and TM mode injection light in the injection light, and then respectively transmits the TE mode injection light and the TM mode injection light to a first waveguide and a second waveguide for subsequent transmission. To be specific, the first waveguide is used to transmit the TE mode injection light, and the second waveguide is used to transmit the TM mode injection light. Subsequently, a polarization rotator 41 in the polarization splitter-rotator 40 converts the TM mode injection light of the second waveguide into the TE mode injection light, and then outputs the TE mode injection light of the first waveguide and the TE mode injection light of the second waveguide to a bandpass filter 50. To be specific, after the injection light in any polarization state passes through the polarization splitter-rotator 40, both the injection light output by the two waveguides (the first waveguide and the second waveguide) of the polarization splitter-rotator 40 are TE mode injection light.

The bandpass filter 50 is configured to filter a clutter of a non-target frequency component in the injection light, to enable a frequency component in a frequency range to pass through and effectively attenuate a frequency component in another frequency range. Optionally, the bandpass filter 50 may implement a function of calibrating an input wavelength. For details, see descriptions in a related embodiment in FIG. 3. Details are not described herein. After passing through the bandpass filter 50, the injection light is finally injected into a slave laser 60.

A light beam generated from the slave laser 60 enters the optical splitter 30 through the third port after passing through the bandpass filter 50 and the polarization splitter-rotator 40, one part of the light beam is output through the first port, and the other part of the light beam is output through a second port to a first power detector 10.

The first power detector 10 is configured to detect optical power of light output through the second port, and generate a first detection signal.

A first controller 20 is connected to the first power detector 10, and is configured to perform current adjustment and/or temperature adjustment on the slave laser 60 based on the first detection signal, to change a transmit wavelength of the slave laser 60, so as to enable the optical power detected by the first power detector 10 to reach a first preset value (for example, a maximum value). In this way, injection locking is implemented.

In the laser chip provided in this embodiment of this application, the injection light of the master laser can be efficiently injected into the slave laser 60, and optical power of the slave laser 60 can be effectively detected under action of the first power detector 10 and the first controller 20, and a current and/or temperature of the slave laser 60 can be automatically adjusted based on the first detection signal generated by the first power detector 10, to implement stable and efficient injection locking. In this way, good practicability is achieved.

The optical splitter 30 is a passive device. Provided that there is input light, external energy is not needed.

In specific application, the optical splitter 30 may be a 2*1 optical splitter. Specifically, the optical splitter 30 includes three ports: the first port, the second port, and the third port. The first port and the third port may be used as input ports or output ports. To be specific, the injection light of the master laser may be injected into the optical splitter 30 through the first port and output through the third port. A light beam of the slave laser 60 may be injected into the optical splitter 30 through the third port, and output through the first port. The second port may be used as an output port. After a light beam of the slave laser 60 is injected into the optical splitter 30 through the third port, one part of the light beam may be output through the first port, and the other part of the light beam may be output through the second port. A small part of the light beam of the slave laser 60 may be output through the second port, to enable the first power detector 10 to detect the optical power. A most part of the light beam may be output through the first port, to implement efficient signal transmission.

It may be understood that in some embodiments, a type of the optical splitter 30 is not limited in this application.

A main function of the polarization splitter-rotator (PSR) 40 is to split the injection light, and convert the TM mode injection light in the injection light into the TE mode injection light. In some embodiments, the PSR 40 may be an integrated device. To be specific, after the injection light in any polarization state passes through the PSR 40, both the injection light output by the two waveguides (the first waveguide and the second waveguide) of the polarization splitter-rotator 40 are TE mode injection light. Alternatively, the PSR 40 may include two discrete devices: a beam splitter and a polarization rotator.

The beam splitter is an optical device that can split one beam of light into two or more beams of light, and is usually made of a metal film or a dielectric film. After the injection light passes through the beam splitter, the TE mode injection light in the injection light is output from one optical path, and the TM mode injection light in the injection light is output from another optical path. The polarization rotator may adjust the polarization state of the light. Specifically, the TM mode injection light in the injection light is output from another optical path of the beam splitter and then enters the polarization rotator. The polarization rotator deflects the TM mode injection light, and finally converts the TM mode injection light into TE mode injection light.

It may be understood that, in some embodiments, the PSR 40 may be an integrated device, or may be a device including a beam splitter and a polarization rotator. Alternatively, another device that can split and deflect a light beam may be used, which is not limited herein. It is to be noted that, for ease of understanding technical solutions of this application, in the following embodiments, an example in which the PSR 40 is an integrated device is used for specific description.

In addition, in specific application, the bandpass filter 50 may be a silicon-based optical microring resonant cavity, or may be a lithium niobate thin film microring resonant cavity, a Mach Zehnder interferometer resonant cavity, or the like. In addition, the microring resonant cavity may be a single microring structure, or may be a cascaded microring structure. In specific application, a type of the bandpass filter 50 may be correspondingly selected and adjusted based on an actual requirement. This is not limited in this application.

The slave laser 60 may be a directly modulated semiconductor laser (DML), or may be a continuous wave laser (CW laser), or may be a laser of another type. This is not limited in this application.

In some embodiments, to adjust a wavelength of a light beam generated by the slave laser 60, the first controller 20 may perform current adjustment on the slave laser 60. Alternatively, the operating temperature of the slave laser 60 may be adjusted.

Specifically, because the wavelength of the light beam generated by the slave laser 60 is related to the current and the operating temperature of the slave laser 60, the wavelength of the light beam may be changed by adjusting the current and/or the temperature.

In some embodiments, the slave laser 60 may be a semiconductor laser with a thermo electric cooler 61 (TEC). The first controller 20 is connected to the thermo electric cooler 61, and is configured to adjust heating power of the thermo electric cooler 61 by controlling a current of the thermo electric cooler 61, to adjust the operating temperature of the slave laser 60, and further adjust the wavelength of the light beam generated by the slave laser 60. During adjustment, the wavelength of the light beam may be adjusted by changing only the current of the slave laser 60, or the wavelength of the light beam may be adjusted by changing only the operating temperature of the slave laser 60. Alternatively, the current and the operating temperature of the slave laser 60 may be changed at the same time to adjust the wavelength of the light beam, to implement efficient, stable, and accurate adjustment.

In specific application, the first controller 20 may include three functional units: an analog-to-digital and digital-to-analog conversion unit (AD/DA), a microcontroller unit (MCU), and an electric drive unit.

The first power detector 10 may be a photodiode based on a Ge/Si structure, or may use a III-V semiconductor chip or an optical power detecting device of another type, to implement good detecting on optical power.

In addition, the laser chip may be a silicon photonic chip of an SOI (Silicon-On-Insulator) platform, or may be a heterogeneous integrated optical chip or the like. In specific application, an integration type of the laser chip may be properly selected based on different requirements. This is not limited herein.

When performing injection locking, the first power detector 10 may continuously or periodically detect optical power of the second port. The first controller 20 may adjust the current and the operating temperature of the slave laser 60. When optical power received by the first power detector 10 is the maximum, it indicates that injection locking is implemented on the slave laser 60. In this case, the current and the operating temperature of the slave laser 60 are maintained, to implement stable and long-term injection locking.

Figure 3:
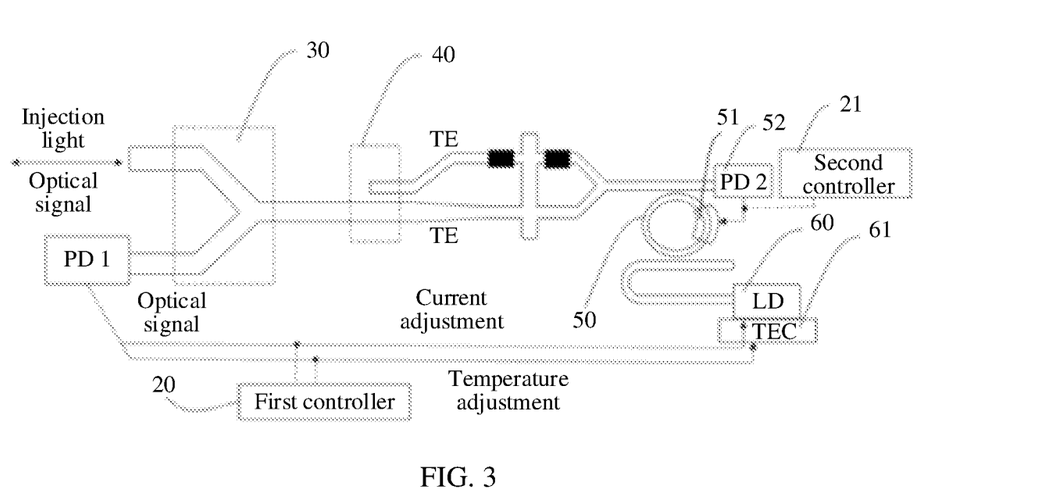
FIG. 3 is a simplified schematic diagram of a structure of another laser chip according to an embodiment of this application.

FIG. 3 is a simplified schematic diagram of a structure of another laser chip according to an embodiment of this application. As shown in FIG. 3, in an embodiment provided in this application, the laser chip further includes a bandpass filter heater 51, a second power detector 52, and a second controller 21.

Because a center frequency of the bandpass filter 50 is related to operating temperature, the center frequency of the bandpass filter 50 can be effectively adjusted by controlling the temperature of the bandpass filter 50. To be specific, the bandpass filter heater 51 is configured to control the temperature of the bandpass filter 50, to change the center frequency of the bandpass filter 50, so that a frequency of injection light of a master laser is aligned with the center frequency of the bandpass filter 50, and the injection light can be efficiently used.

When adjusting the center frequency of the bandpass filter 50, the second power detector 52 may select a proportion (for example, 5%) of optical power, to detect optical power filtered by the bandpass filter 50, and generate a second detection signal. The second controller 21 is connected to the second power detector 52 and the bandpass filter heater 51, and is configured to adjust heating power of the bandpass filter heater 51 based on the second detection signal, to change the center frequency of the bandpass filter 50, so as to enable the optical power detected by the second power detector 52 to reach a second preset value (for example, a minimal value).

In specific application, the second controller 21 may include three functional units: an analog-to-digital and digital-to-analog conversion unit (AD/DA), a MCU, and an electric drive unit.

A type of the second power detector may be the same as that of the first power detector, and details are not described herein again. The second power detector may continuously or periodically detect the optical power filtered by the bandpass filter 50. The second controller 21 may adjust power of the bandpass filter heater 51, to change the operating temperature of the bandpass filter 50. When optical power received by the second power detector 52 is the minimum, it indicates that the frequency of the injection light of the master laser is aligned with the center frequency of the bandpass filter 50. In this case, current heating power of the bandpass filter heater 51 may be maintained, to implement stable and long-term frequency alignment.

In addition, a transmit wavelength of the slave laser 60 may be adjusted when the injection locking of the slave laser 60 is implemented, or when optical power received by the second power detector 52 is the minimum.

Specifically, the first controller 20 is further connected to the second power detector 52. The first controller 20 is configured to: when the optical power detected by the second power detector 52 reaches the second preset value (for example, the minimum value), perform current adjustment and/or temperature adjustment on the slave laser 60 based on the first detection signal, to change the transmit wavelength of the slave laser 60, so as to enable the optical power detected by the first power detector 10 to reach a first preset value (for example, a maximum value).

In the foregoing adjustment manner, first, the center frequency of the bandpass filter 50 may be adjusted, so that the center frequency of the bandpass filter 50 is aligned with a center frequency of the injection light, and the injection light can be efficiently used. Then, the transmit wavelength of the slave laser 60 is adjusted, so that the transmit wavelength of the slave laser 60 is aligned with a wavelength of the injection light, to implement stable and efficient injection locking for the slave laser 60.

In addition, in specific application, when the injection light passes through a PSR 40, TM mode injection light in the injection light needs to be converted into TE mode injection light. After the conversion is completed, the two beams of TE mode injection light need to be multiplexed by using a multiplexed-wavelength structure, and then transmitted to the bandpass filter 50.

Specifically, in an embodiment provided in this application, the laser chip further includes the multiplexed-wavelength structure. The multiplexed-wavelength structure is connected to the PSR 40 and the bandpass filter 50, and is configured to multiplex TE mode injection light of two waveguides of the PSR 40 and then transmit multiplexed TE mode injection light to the bandpass filter 50.

In some embodiments, the multiplexed-wavelength structure may be a single coupling waveguide, or may be a plurality of cascaded coupling waveguides. The coupling waveguide may be a Y coupling waveguide, a directional coupler waveguide, or a multimode interferometer waveguide. In some embodiments, a type of the coupling waveguide may be correspondingly selected and adjusted based on an actual requirement. This is not limited in this application.

In addition, to implement coherence enhancement for two beams of multiplexed TE mode injection light, in some embodiments, phases of the two to-be-multiplexed beams of TE mode injection light may also be adjusted.

Figure 4:
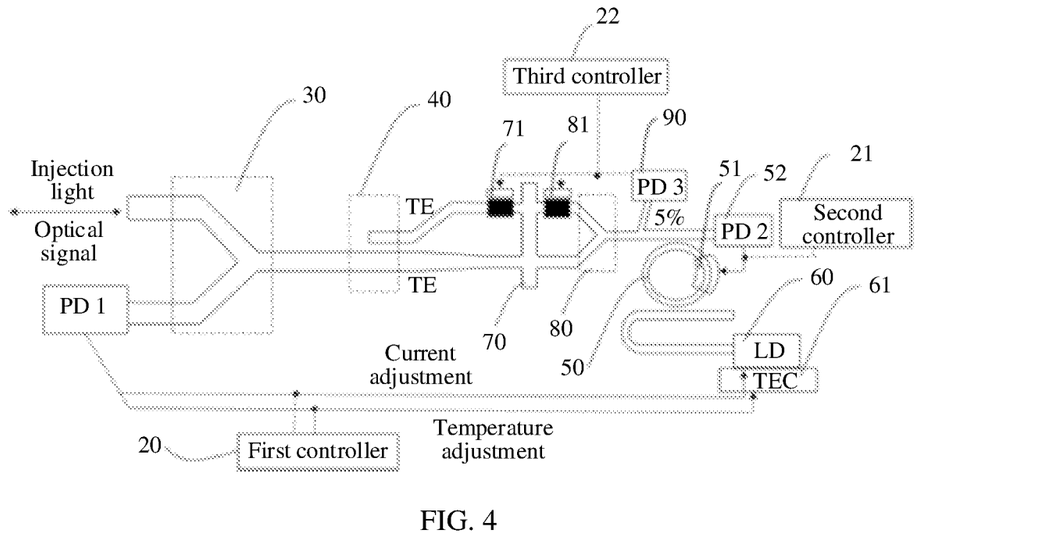
FIG. 4 is a simplified schematic diagram of a structure of another laser chip according to an embodiment of this application.

FIG. 4 is a simplified schematic diagram of a structure of another laser chip according to an embodiment of this application. As shown in FIG. 4, a multiplexed-wavelength structure includes two cascaded coupling waveguides: a first coupling waveguide 70 and a second coupling waveguide 80. The first coupling waveguide 70 is a 2*2 directional coupler waveguide or a multimode interferometer waveguide. The second coupling waveguide 80 is a Y coupling waveguide. The first coupling waveguide 70 has two input ends and two output ends. The two input ends are respectively used to interconnect two TE mode waveguides of a PSR 40. Injection light is multiplexed by the first coupling waveguide 70 and then output through the two output ends to the second coupling waveguide 80 for re-multiplexing. Before a multiplexing process, a phase of one of TE mode injection light beams may be adjusted through temperature control, to implement coherence enhancement for two beams of multiplexed TE mode injection light.

Specifically, in this embodiment provided in this application, the laser chip further includes a first multiplexing heater 71, a second multiplexing heater 81, a third power detector 90, and a third controller 22.

The first multiplexing heater 71 is configured to control temperature of the first coupling waveguide 70, to change a phase of TE mode injection light in the path. The second multiplexing heater 81 is configured to control temperature of the second coupling waveguide 80, to change a phase of TE mode injection light in the path, so as to enable optical power detected by the third power detector 90 to reach a third preset value (for example, a maximum value). Specifically, when the optical power detected by the third power detector reaches the third preset value, it indicates that the coherence enhancement is implemented for the two beams of multiplexed TE mode injection light. In this way, utilization efficiency of the injection light can be effectively improved.

It may be understood that, in another implementation, the multiplexed-wavelength structure may alternatively include three, four, or more cascaded coupling waveguides, to implement higher-precision adjustment on the phase of the TE mode injection light.

Figure 5:
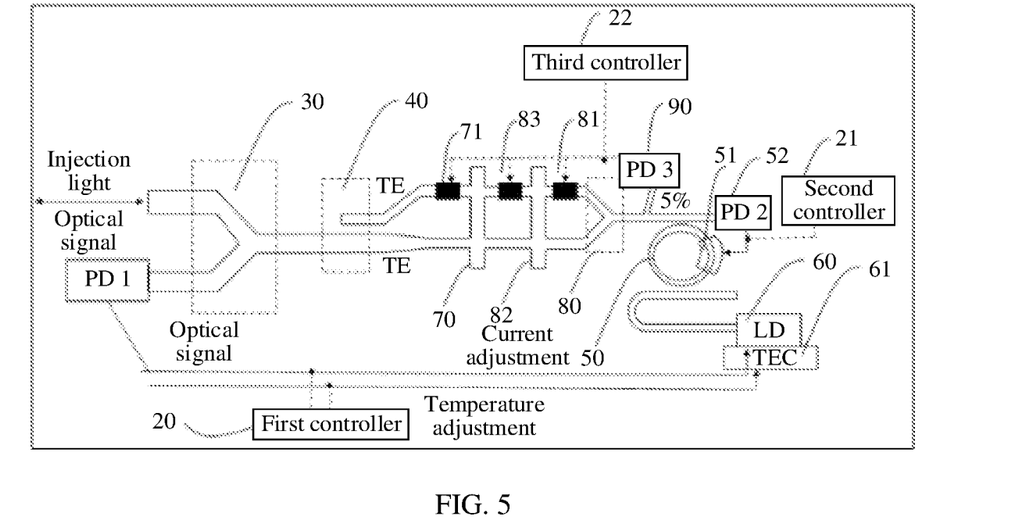
FIG. 5 is a simplified schematic diagram of a structure of another laser chip according to an embodiment of this application.

FIG. 5 is a simplified schematic diagram of a structure of another laser chip according to an embodiment of this application. A multiplexed-wavelength structure includes three cascaded coupling waveguides: a first coupling waveguide 70, a second coupling waveguide 80, and a third coupling waveguide 82. The first coupling waveguide 70 and the third coupling waveguide are 2*2 directional coupler waveguides or multimode interferometer waveguides. The second coupling waveguide 80 is a Y coupling waveguide.

The first coupling waveguide 70 has two input ends and two output ends. The two input ends are respectively used to interconnect two TE mode waveguides of the PSR 40. Injection light is multiplexed by the first coupling waveguide 70, output through the two output ends to the third coupling waveguide 82 for re-multiplexing, multiplexed by the third coupling waveguide 82, and output through two output ends to the second coupling waveguide 80 for re-multiplexing.

The first multiplexing heater 71 is configured to control temperature of the first coupling waveguide 70, to change a phase of TE mode injection light in the path. The third multiplexing heater 83 is configured to control temperature of the third coupling waveguide 82, to change a phase of TE mode injection light in the path. The second multiplexing heater 81 is configured to control temperature of the second coupling waveguide 80, to change a phase of TE mode injection light in the path, so as to enable optical power detected by a third power detector 90 to reach a third preset value (for example, a maximum value). Specifically, when the optical power detected by the third power detector reaches the third preset value, it indicates that coherence enhancement is implemented for two beams of multiplexed TE mode injection light. In this way, utilization efficiency of the injection light can be effectively improved.

It may be understood that, when the multiplexed-wavelength structure includes a plurality of cascaded coupling waveguides, a quantity of disposed multiplexed-wavelength heaters is the same as a quantity of disposed coupling waveguides, and one multiplexed-wavelength heater is disposed in correspondence to one coupling waveguide. Alternatively, in some implementations, the multiplexed-wavelength structure may include a single coupling waveguide, to reduce difficulty and complexity of adjustment.

Figure 6:
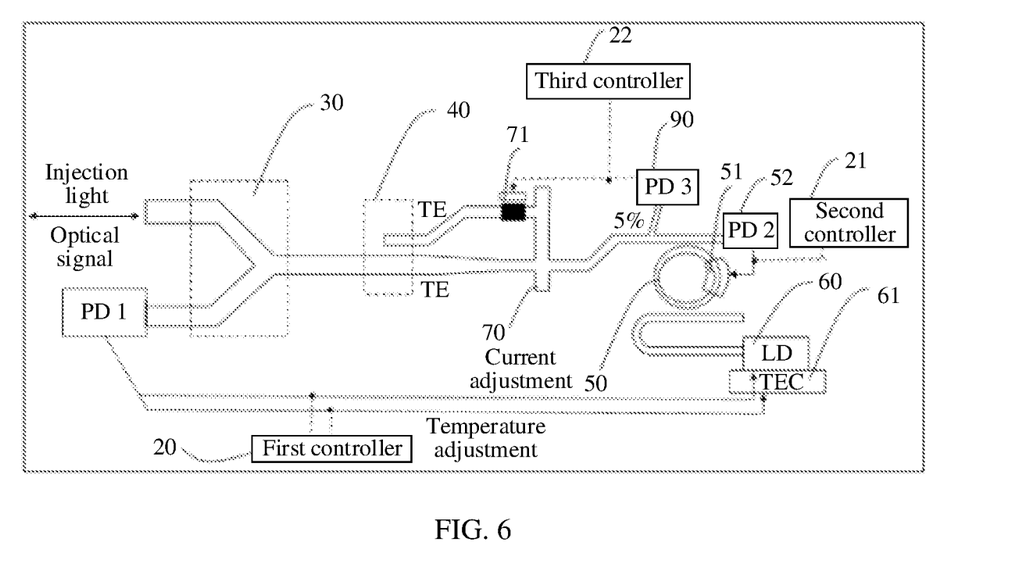
FIG. 6 is a simplified schematic diagram of a structure of another laser chip according to an embodiment of this application.

For example, FIG. 6 is a simplified schematic diagram of a structure of another laser chip according to an embodiment of this application. As shown in FIG. 6, in another embodiment provided in this application, a second coupling waveguide is omitted in a multiplexed-wavelength structure, in other words, the multiplexed-wavelength structure performs multiplexing only by using a first coupling waveguide 70. In a form of a single coupling waveguide, difficulty and complexity of adjustment can be significantly reduced, and this helps reduce costs and research and development input.

In specific application, a third controller 22 may include three functional units: an analog-to-digital and digital-to-analog conversion unit (AD/DA), a MCU, and an electric drive unit.

The specific type of the third power detector may be the same as that of the first power detector, and details are not described herein again.

It may be understood that, when the laser chip includes the foregoing first controller 20, second controller 21, and third controller 22, the three controllers may be discrete devices, or may share one multi-channel microcontroller unit and one electric drive unit.

In some embodiments, types and configuration relationships of the first controller 20, the second controller 21, and the third controller 22 may be adaptively adjusted based on different requirements. This is not limited in this application.

Figure 7:
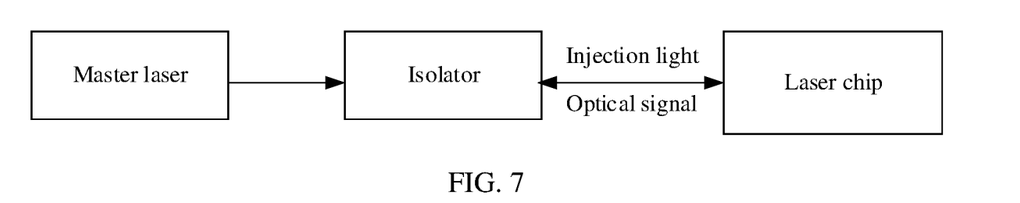
FIG. 7 is a block diagram of a structure of an injection-locked laser according to an embodiment of this application.

In addition, FIG. 7 is a block diagram of a structure of an injection-locked laser according to an embodiment of this application. As shown in FIG. 7, an embodiment of this application further provides an injection-locked laser, including a master laser, an isolator, and any laser chip in the foregoing embodiments.

In some embodiments, the master laser may be an FP laser, a DFB laser, a DBR laser, an EML laser, or the like. The FP laser is a semiconductor light emitting device that uses an FP cavity as a resonant cavity and emits multi-longitudinal-mode coherent light. The FP laser has features such as high output optical power, a small angle of divergence, a narrow spectrum, and a high modulation rate, and is suitable for long-distance communication. The DFB laser uses a grating filter based on the FP laser. The grating filter has only one longitudinal mode output. The grating filter has features such as high output optical power, a small angle of divergence, a narrow spectrum, and a modulation rate, and is suitable for long-distance communication. The DBR laser uses a fiber Bragg grating as a reflector, and encapsulates a doped optical fiber between two fiber Bragg gratings, to provide a gain by pumping the in-between doped fiber. The EML laser has advantages of low costs and low power consumption, has good performance in terms of a chirping effect, an extinction ratio, a transmission distance, and the like, and can implement high-rate and long-distance transmission.

It may be understood that in some embodiments, a type of the master laser may be selected and adjusted based on an actual situation. This is not limited in this application.

The isolator is a passive optical device for non-reciprocal optical transmission, and a basic function of the isolator is to implement forward transmission of a light beam and suppress a light beam in a reverse direction. Injection light of the master laser is injected into the laser chip through the isolator, so that reflected light generated by a slave laser 60 is not transmitted to the master laser, to ensure work stability of the master laser.

In actual application, the injection-locked laser may be used in a plurality of network devices to implement signal transmission.

Figure 8:
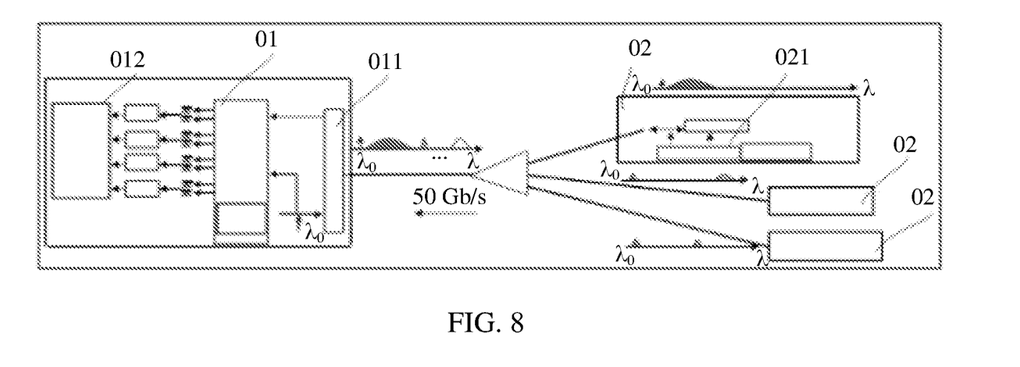
FIG. 8 is a diagram of a system architecture of a passive optical network according to an embodiment of this application.

FIG. 8 is a diagram of a system architecture of a passive optical network according to an embodiment of this application. As shown in FIG. 8, a passive optical network (PON) includes an optical line termination (OLT) 01 and several optical network units (ONUs) 02. An injection-locked laser may be used as a light source in the ONU 02. Injection light generated by a master laser is injected into the injection-locked laser after passing through an optical distribution network (ODN), to implement injection locking. A signal of a frequency division multiple access (FDMA) device 021 is modulated to the injection-locked laser, signal light emitted by the injection-locked laser reaches the OLT 01 through an optical fiber and the optical distribution network, and a related device (for example, a data selector 011 and a digital signal processor 012) in the OLT 01 performs coherent reception and signal processing, to parse out an optical signal of each ONU 02.

The passive optical network means that there is no active electronic device in an ODN between the OLT 01 and the ONU 02. Generally, a time division multiplexing broadcast mode is used for downstream, and a time division multiple access mode is used for upstream. In addition, topology structures such as tree, star, and bus structures can be flexibly formed. Typically, the tree structure is used, and all ONUs 02 may share an optical fiber between the OLT 01 and an optical splitter. In this way, less optical fibers for routing are used, and service transparency is good. In principle, ONUs may be jointly used for a signal of any standard and rate, and this facilitates network expansion and maintenance. As key components of an optical network, the OLT 01 and the ONU 02 are responsible for performing electrical signal to optical signal conversion and transmission on a network signal, and are a basis for normal communication in the entire network.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A laser chip, comprising:
a first power detector, a first controller, an optical splitter, a polarization splitter-rotator, a bandpass filter, and a slave laser, wherein
the optical splitter, the polarization splitter-rotator, the bandpass filter, and the slave laser are sequentially connected;
the optical splitter comprises a first port, a second port, and a third port, wherein the first port is configured to receive injection light of a master laser, the second port is connected to the first power detector, and the third port is connected to the polarization splitter-rotator;

the optical splitter is configured such that the injection light enters the optical splitter through the first port, and is output to the polarization splitter-rotator through the third port;

the polarization splitter-rotator is configured to perform optical splitting and polarization conversion on the injection light comprising: the polarization splitter-rotator is configured to split the injection light thereby separating TE mode injection light and TM mode injection light of the injection light, and the polarization splitter-rotator is configured to transmit the TE mode injection light to a first waveguide and the TM mode injection light to a second waveguide;

the polarization splitter-rotator comprises the first waveguide and the second waveguide, wherein the first waveguide is configured to transmit the TE mode injection light, the second waveguide is configured to receive the TM mode injection light and to transmit the TE mode injection light, the first waveguide and the second waveguide are configured to output the TE mode injection light to the bandpass filter, and the bandpass filter is configured to inject the TE mode injection light into the slave laser;

the slave laser is configured to generate a light beam, the third port of the optical splitter is configured to receive the light beam from the slave laser, the first port is configured to output a first part of the light beam to the first power detector, and the second port is configured to output a second part of the light beam to the first power detector;

the first power detector is configured to detect an optical power of the second part of the light beam, and generate a first detection signal; and the first controller is configured to perform at least one of current adjustment or temperature adjustment on the slave laser based on the first detection signal, and to change a transmit wavelength of the slave laser, thereby enabling the optical power detected by the first power detector to reach a first preset value.

2. The laser chip according to claim 1, wherein the laser chip further comprises a bandpass filter heater, a second power detector, and a second controller, wherein the bandpass filter heater is configured to control a temperature of the bandpass filter, and to change a center frequency of the bandpass filter;

the second power detector is configured to detect an optical power filtered by the bandpass filter, and to generate a second detection signal; and the second controller is connected to the second power detector and the bandpass filter heater, is configured to adjust a heating power of the bandpass filter heater based on the second detection signal, and to change the center frequency of the bandpass filter thereby enabling the optical power detected by the second power detector to reach a second preset value.

3. The laser chip according to claim 2, wherein the first controller is further connected to the second power detector; and the first controller is further configured to:

perform at least one of current adjustment or temperature adjustment on the slave laser based on the first detection signal in response to the optical power detected by the second power detector reaching the second preset value, and to change the transmit wavelength of the slave laser thereby enabling the optical power detected by the first power detector to reach the first preset value.

4. The laser chip according to claim 1, wherein the laser chip further comprises:

a multiplexer, wherein the polarization splitter-rotator is connected to the bandpass filter via the multiplexer, and the multiplexer is configured to multiplex the TE mode injection light of the first waveguide and the second waveguide of the polarization splitter-rotator, and to transmit a multiplexed TE mode injection light to the bandpass filter.

5. The laser chip according to claim 4, wherein the multiplexer comprises a plurality of cascaded coupling waveguides.

6. The laser chip according to claim 5, wherein at least a cascaded coupling waveguide of the plurality of cascaded coupling waveguides is a Y coupling waveguide, a directional coupler waveguide, or a multimode interferometer waveguide.

7. The laser chip according to claim 1, wherein the laser chip further comprises multiplexed-wavelength heaters, a third power detector, and a third controller, wherein a first multiplexed-wavelength heater of the multiplexed-wavelength heaters is configured to control a temperature of a multiplexer, and to change a phase of the TE mode injection light output by the second waveguide thereby enabling an optical power detected by the third power detector to reach a third preset value.

8. The laser chip according to claim 7, wherein the multiplexer comprises a plurality of cascaded coupling waveguides, a quantity of the multiplexed-wavelength heaters is equal to a quantity of the plurality of cascaded coupling waveguides, and one multiplexed-wavelength heater of the multiplexed-wavelength heaters is disposed in correspondence to one coupling waveguide of the plurality of cascaded coupling waveguides.

9. The laser chip according to claim 1, wherein the laser chip further comprises a slave laser heater; and the slave laser heater is configured to control a temperature of the slave laser, wherein the first controller is connected to the slave laser heater, and is further configured to adjust a heating power of the slave laser heater based on the first detection signal, and to change the transmit wavelength of the slave laser thereby enabling the optical power detected by a first power detector to reach the first preset value.

10. The laser chip according to claim 9, wherein the slave laser heater is a thermoelectric cooler.

11. The laser chip according to claim 10, wherein the laser chip is a silicon photonic chip of a silicon on insulator (SOI) platform.

12. The laser chip according to claim 11, wherein the slave laser and the silicon photonic chip are of a heterogeneous integration structure.

13. The laser chip according to claim 12, wherein the bandpass filter is one of:

a microring resonant cavity, a lithium niobate thin film microring resonant cavity, or a Mach Zehnder interferometer resonant cavity.

14. An injection-locked laser, comprising a master laser, an isolator, and a laser chip, wherein the master laser is configured to generate injection light that enters a first port of an optical splitter after passing through the isolator; and the laser chip comprises:

a first power detector, a first controller, the optical splitter, a polarization splitter-rotator, a bandpass filter, and a slave laser, wherein the optical splitter, the polarization splitter-rotator, the bandpass filter, and the slave laser are sequentially connected;

the optical splitter comprises the first port, a second port, and a third port, wherein the first port is configured to receive injection light of the master laser, the second port is connected to the first power detector, and the third port is connected to the polarization splitter-rotator;

the optical splitter is configured such that the injection light enters the optical splitter through the first port, and is output to the polarization splitter-rotator through the third port;

the polarization splitter-rotator is configured to perform optical splitting and polarization conversion on the injection light comprising: the polarization splitter-rotator is configured to split the injection light thereby separating TE mode injection light and TM mode injection light of the injection light, and the polarization splitter-rotator is configured to transmit the TE mode injection light to a first waveguide and the TM mode injection light to a second waveguide;

the polarization splitter-rotator comprises the first waveguide and the second waveguide, wherein the first waveguide is configured to transmit the TE mode injection light, the second waveguide is configured to receive the TM mode injection light and to transmit the TE mode injection light, the first waveguide and the second waveguide are configured to output the TE mode injection light to the bandpass filter, and the bandpass filter is configured to inject the TE mode injection light into the slave laser;

the slave laser is configured to generate a light beam, the third port of the optical splitter is configured to receive the light beam from the slave laser, the first port is configured to output a first part of the light beam to the first power detector, and the second port is configured to output a second part of the light beam to the first power detector;

the first power detector is configured to detect an optical power of the second part of the light beam, and generate a first detection signal; and the first controller is configured to perform at least one of current adjustment or temperature adjustment on the slave laser based on the first detection signal, and to change a transmit wavelength of the slave laser, thereby enabling the optical power detected by the first power detector to reach a first preset value.

15. A network device, comprising a frequency division multiple access device and an injection-locked laser, wherein the frequency division multiple access device is configured to modulate a signal to the injection-locked laser, and the injection-locked laser is configured to transmit the signal as an optical signal;

the injection-locked laser comprises: a master laser, an isolator, and a laser chip, wherein the master laser is configured to generate injection light that enters a first port of an optical splitter after passing through the isolator; and the laser chip comprises:

a first power detector, a first controller, the optical splitter, a polarization splitter-rotator, a bandpass filter, and a slave laser, wherein the optical splitter, the polarization splitter-rotator, the bandpass filter, and the slave laser are sequentially connected;

the optical splitter comprises the first port, a second port, and a third port, wherein the first port is configured to receive injection light of the master laser, the second port is connected to the first power detector, and the third port is connected to the polarization splitter-rotator;

the optical splitter is configured such that the injection light enters the optical splitter through the first port, and is output to the polarization splitter-rotator through the third port;

the polarization splitter-rotator is configured to perform optical splitting and polarization conversion on the injection light comprising: the polarization splitter-rotator is configured to split the injection light thereby separating TE mode injection light and TM mode injection light of the injection light, and the polarization splitter-rotator is configured to transmit the TE mode injection light to a first waveguide and the TM mode injection light to a second waveguide;

the polarization splitter-rotator comprises the first waveguide and the second waveguide, wherein the first waveguide is configured to transmit the TE mode injection light, the second waveguide is configured to receive the TM mode injection light and to transmit the TE mode injection light, the first waveguide and the second waveguide are configured to output the TE mode injection light to the bandpass filter, and the bandpass filter is configured to inject the TE mode injection light into the slave laser;

the slave laser is configured to generate a light beam, the third port of the optical splitter is configured to receive the light beam from the slave laser, the first port is configured to output a first part of the light beam to the first power detector, and the second port is configured to output a second part of the light beam to the first power detector;

the first power detector is configured to detect an optical power of the second part of the light beam, and generate a first detection signal; and the first controller is configured to perform at least one of current adjustment or temperature adjustment on the slave laser based on the first detection signal, and to change a transmit wavelength of the slave laser, thereby enabling the optical power detected by the first power detector to reach a first preset value.

16. The network device according to claim 15, wherein the network device is an optical line terminal device or an optical network unit device.

\* \* \* \* \*